United States Patent

[11] 3,610,549

| [72] | Inventors | Carl G. Wennerstrom<br>Evanston;<br>Paul M. Sievert, Oak Park, both of Ill. |
|---|---|---|
| [21] | Appl. No. | 744,808 |
| [22] | Filed | July 15, 1968 |
| [45] | Patented | Oct. 5, 1971 |
| [73] | Assignee | Sievert Electric Co.<br>Chicago, Ill. |

[54] CABLE WIND DEVICE AND WINDING PATTERN
7 Claims, 9 Drawing Figs.

| [52] | U.S. Cl. | 242/176, 242/117 |
|---|---|---|
| [51] | Int. Cl. | B65h 55/04, B65h 75/14 |
| [50] | Field of Search | 242/117, 159, 176 |

[56] References Cited
UNITED STATES PATENTS

| 1,504,005 | 8/1924 | Vienneau | 242/117 UX |
| 1,822,422 | 9/1931 | Richardson | 242/117 |
| 1,865,256 | 6/1932 | Johannesen | 242/117 UX |
| 2,816,310 | 12/1957 | Nale | 242/117 UX |
| 3,272,454 | 9/1966 | Lane et al. | 242/117 |

*Primary Examiner*—George F. Mautz
*Attorney*—Robert L. Slater, Jr.

ABSTRACT: A cable wind device having a drum with end flanges tapering outwardly and away from each other. The crossover portion of the coils of one layer of cable wind is spaced from the crossover portion of the coils of the other cable layers.

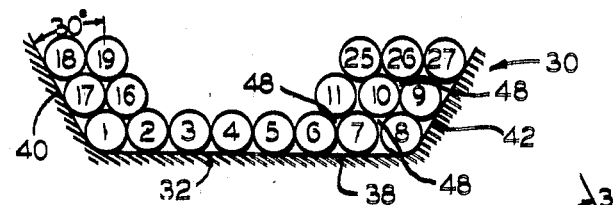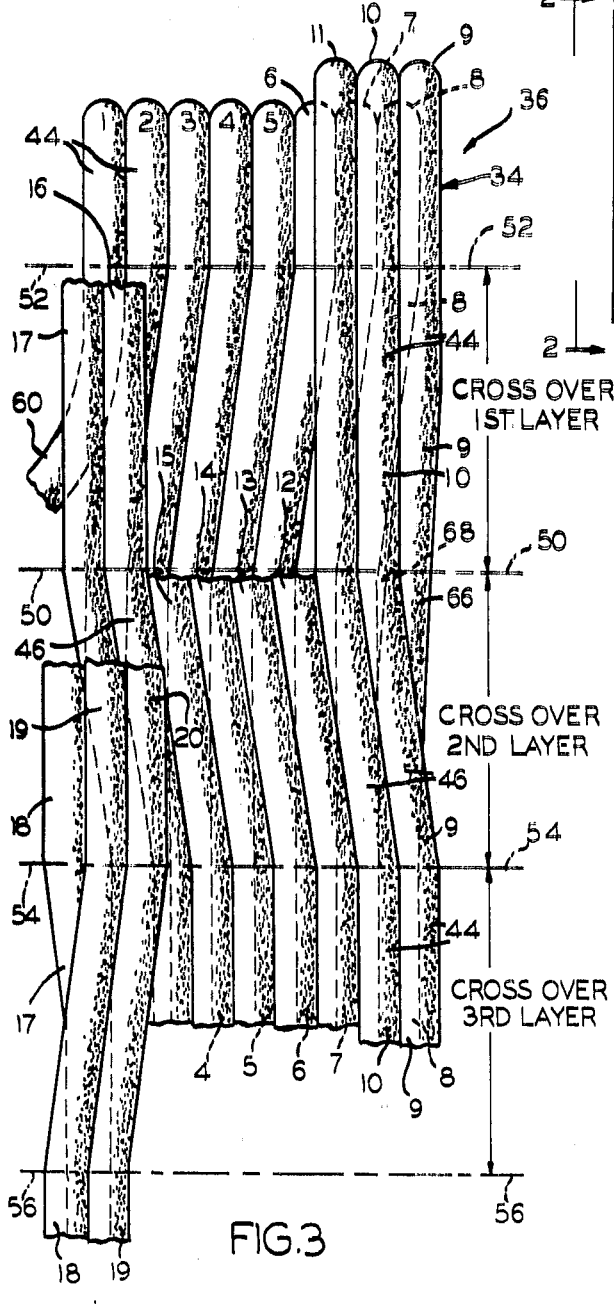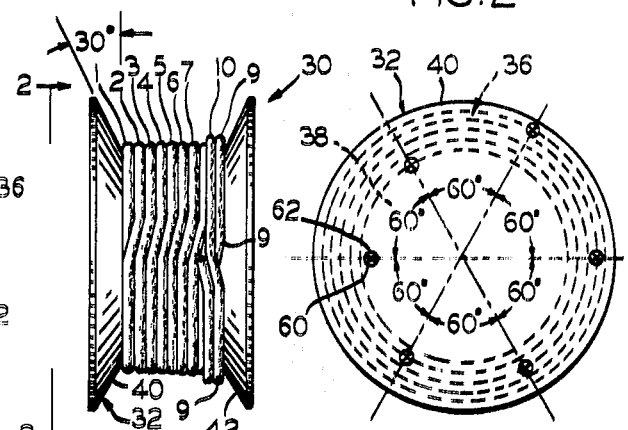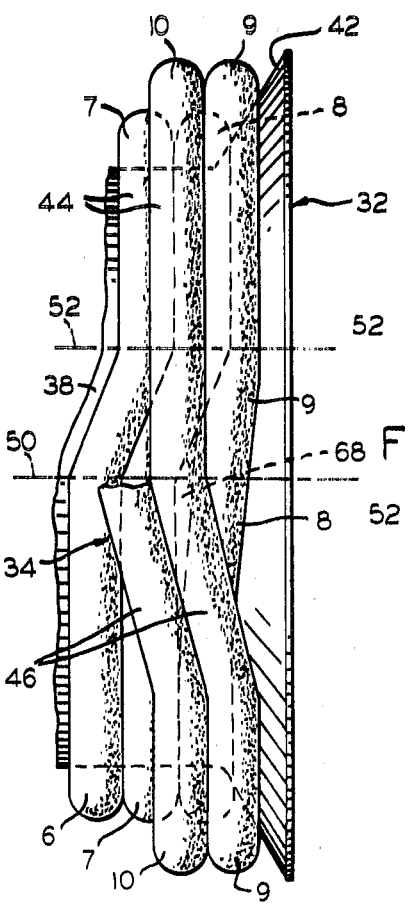

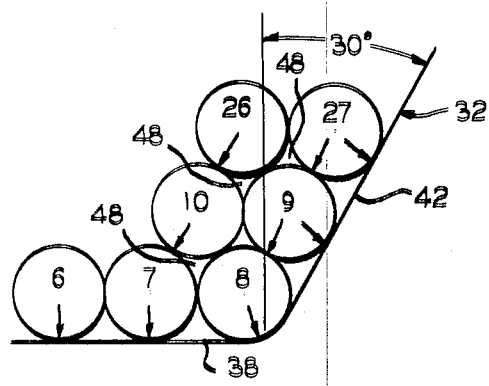
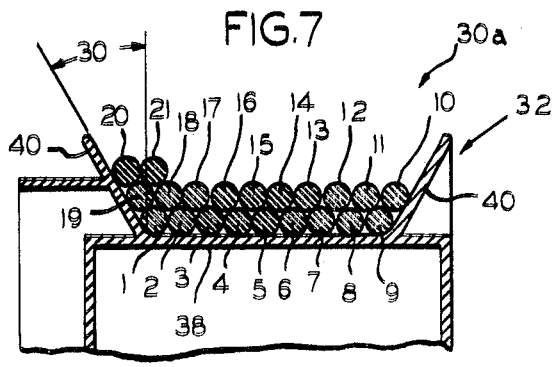
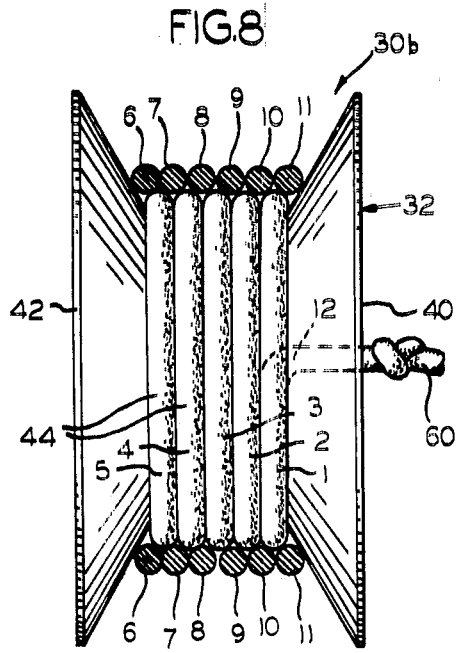
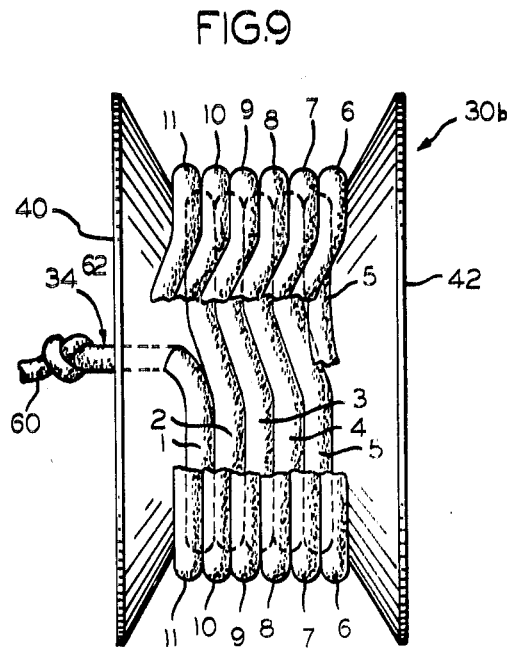

CABLE WIND DEVICE AND WINDING PATTERN

BACKGROUND OF THE INVENTION

The invention relates generally to a cable wind device and cable pattern, and more particularly relates to a cable winding means for providing a compact and substantially even wind of cable on a drum.

Previously, cable frequently entangled or became knotted when lengths of the cable were spooled or unspooled from a cable drum. In many instances, this appreciably damaged the cable or substantially reduced its period of effective use. Cable fouling was attributed primarily to either looseness in the cable wind or an uneven coil buildup at various locations on the drum which prevented the coils from being unspooled in the desired sequence. Usually, the uneven cable buildup occurred at the crossover points of the wound cable coils and adjacent the end flanges of the drum.

In many of the prior cable wind devices grooves were formed in the periphery of the drum core. These grooves guided the first layer of coils on the drum and defined the exact point of crossover of the cable from the first cable layer to the second cable layer. When a substantial number of cable layers were wound on the drum, these grooved cable drums afforded very little safeguard against cable fouling or localized cable buildup. Moreover, the effectiveness of these grooved drums were still further limited by being usable only with cable having practically the same diameter as the groove. Still another undesirable feature of these prior devices was that filler members were required to be inserted between the end coils and the flanges of the cable drum in an attempt to maintain the coils in place.

In some of the earlier cable wind devices, cable drums were formed with tapered end flanges. Often these end flanges were also grooved to accommodate the end coils. These prior tapered cable drums provided some reduction in the localized buildup of coils adjacent the flanges but afforded very little, if any, cooperation with the cable coils to provide a compact cable wind. The tapered flanges of the present invention are particularly constructed to afford means to prevent cable buildup at the ends of the drum, and, in addition, to cooperate with the cable coils and substantially contribute to the compact and even wind of the cable on the cable drum.

SUMMARY OF THE INVENTION

The present invention provides means for winding a cable in a compact and substantially even wind pattern. The cable pattern prevents localized buildup of coils anywhere on the cable drum by progressively advancing the crossover for each layer of coils around the periphery of the drum whereby the crossover of the coils of one layer is spaced from the crossover of the coils of each of the other layers. Moreover, the crossover from the last coil of one layer to the first coil of the next layer is advanced in a laterally outward direction.

The winding device comprises a cable drum formed with tapered end flanges to enable the crossover of the end coils of successive cable layers to extend in a laterally outward direction. This prevents localized buildup of coils adjacent the flanges. Furthermore, due to the angle of the taper, the end coils of each layer are supported by the tapered wall of the adjacent flange and adjacent coils. Therefore, the tapered flanges cooperate with the coils and substantially contribute to the forming of a positive and compact cable wind on the drum.

It is therefore a primary object of this invention to provide a compact and even wind cable pattern which overcomes the previous problem of cable fouling and entanglement. A related object is to provide this compact and even wind cable pattern without forming grooves in the cable drum and without using filler members between the end flanges and the end coils.

Another object is to progressively advance the crossover of the successive layers of coils around the periphery of the drum to provide a substantially even wind cable pattern.

Another object is to provide a cable device having tapered flanges to prevent localized buildup of cable coils adjacent the flanges and to cooperate with the cable coils and provide a compact cable wind.

Another object is to space the crossover from one layer to the next layer in a laterally outward direction and thereby prevent a localized buildup of coils adjacent the end coils.

Still another object is to taper the end flanges of the cable drum 30° to enable each layer of cable to be compactly positioned between the end flanges.

Still another object is to wind each of the coils between the end coils so that a substantial portion of each wind is stably and positively positioned in a groove formed by and between two coils of the layer below.

BRIEF DESCRIPTION OF THE DRAWINGS

Referring to the drawings in which the same characters of reference are employed to indicate corresponding or similar parts throughout the several figures of the drawings.

FIG. 1 is a front elevational view of a partially wound cable drum embodying the principles of the invention;

FIG. 2 is a side view of the cable drum, viewed from the plane of the line 2–2 in FIG. 1 in the direction indicated, and showing by the letter X the variation in position of the crossover points around the drum for the layers of wind;

FIG. 3 shows the cable wind pattern developed on a planar surface and particularly illustrating the relative positions for the crossover of the coils of the first layer, second layer and third layer;

FIG. 4 is an enlarged fragmentary sectional view of the cable drum with some of the coils of the cable layers removed for convenience of illustration, and showing the coils positioned in alignment with the same numbered coils in FIG. 3;

FIG. 5 is an enlarged fragmentary elevational sectional view showing the crossover of the coils from the first layer to the second layer;

FIG. 6 is a fragmentary enlarged view of FIG. 4 showing the distribution of force of the cable coils against adjacent coils and the flange;

FIG. 7 is another embodiment illustrating the principles of the invention for a greater number of coils per layer than the embodiment in FIG. 1;

FIG. 8 is another embodiment illustrating the principles of the invention for a less number of coils per layer than the embodiments of FIGS. 1 and 7; and FIG. 9 shows the opposite side of the coils with respect to the position shown in FIG. 8 to illustrate the crossover of first and second layers of coils.

DESCRIPTION OF THE PREFERRED EMBODIMENT

Referring now to FIGS. 1 to 6 of the drawings, reference numeral 30 indicates generally a cable wind device embodying the principles of the invention. The cable wind device 30 comprises a drum 32 having a cable 34 wound thereon (Figs. 1 and 3) in a pattern indicated by the reference numeral 36 (Fig. 3). The cable pattern 36 affords a compact and substantially even wind of the cable 34 on the drum 32.

The cable device of this invention contemplates the winding of a plurality of coiled layers on the drum 32. For the convenience of illustration, the coils are designated by the numerals 1 through 27. FIGS. 1, 3, 4 to 6 illustrate eight coils in the bottom layer with the number of coils of each subsequent layer being greater by one than the previously wound layer. Therefore, with this winding arrangement three layers of coils comprise 27 coils.

The drum 32 comprises a cylindrical drum core 38 having a pair of spaced circular flanges 40, 42 formed to the opposed ends of the core 38. As shown, the inside surface of the flanges 40, 42 taper outwardly from the core 38 and away from each other. The angle of taper preferably should be 30° (Figs. 1, 4, 5 and 6). The 30° taper enables the coils to be positioned compactly between the flanges 40, 42, as will be more fully explained further in the description.

Each coil 1 through 27, comprises a greater or main portion 44 and a crossover portion 46 (Fig. 3). The main portion 44 of a coil extends for approximately 300° around the drum core 38.

Each main portion 44 of the coils between the end coils and above the bottom coil layer is positioned within a groove 48 defined by two coils of a layer of coils below. For example, coil 10 shown in FIG. 4 is positioned in the groove 48 between coils 7 and 8 and supported by these coils. Similarly, coil 11 is positioned in the groove between coils 6. Therefore, the main portion 44 of the coil is in a stable and supportable position.

The tapered flanges 40, 42 of the drum 32 enables the cable to be wound without any bunching and buildup of coils adjacent the flanges 40, 42. Due to these tapered flanges, the end coils are wound to extend laterally outward from the end coils of the previously wound layers. Thus, as shown in FIG. 4, coil 27 extends further outward than coils 9 and 8, and coil 9 extends further outward than coil 8 (see also Fig. 5).

In the cable pattern 36 (see Figs. 2 and 3), the crossover for the coils of the successively wound layers of cable is progressively varied around the periphery of the drum core 38. Referring particularly to FIG. 3, it will be seen that the crossover portion 46 for the coils 1 to 8 of the first layer begins substantially on an imaginary line 50 and ends substantially on an imaginary line 52. The crossover portion of the coils 9 to 17 of the second layer of coils begins substantially on an imaginary line 54 and ends substantially on the line 50. The crossover portion 46 of each cable coil extends for an arcuate distance of approximately 60° on the drum core. The crossover for the third layer begins at a distance approximately 60° below the line 54 on an imaginary line 56 and ends substantially on the line 54. The imaginary boundary lines defining the beginning and ending points for the coils of successive cable layers, lie on planes passing through the central longitudinal axis of the drum 32 and are progressively spaced apart around the drum by an arcuate distance of approximately 60°.

The method for winding the cable pattern 36 shown in FIGS. 1, 3, 4, and 5 and 6 will now be described. One end 60 of the cable 34 may be knotted at the outside of the flange 40 to prevent cable slippage. The cable end 60 extends through an aperture 62 formed in the flange 40 (Fig. 2). The coils 1 to 8 comprising the first cable layer are wound in a clockwise direction. The crossover portion 46 from one coil to the next coil is angled toward the flange 42. The crossover for the coils of the first layer lies on substantially parallel planes passing through the central longitudinal axis of the drum. The main portion 44 of the coils is wound in a plane substantially perpendicular to the central axis of the drum. The wind of the main portion 44 is approximately 300° and the crossover portion 46 is approximately 60°.

As shown particularly in FIG. 3, the leading end portion 66 of coil 8 is angled slightly toward the tapered flange 42 just prior to reaching line 50; leaving a space 68 between coil 7 and the leading end portion 66 of coil 8 adjacent to coil 9. Coil 9 starts at the line 50 and is wound for approximately 300° on top of coil 8 and in abutment with the tapered flange 42 (Figs. 3 and 4). At the end of this 300° wind, coil 9 is at the line 54. Then, the wind is angled inwardly toward the other flange 40 to commence the crossover from coil 9 to coil 10. The crossover portion 46 of coil 9 is angled through an arcuate distance of approximately 60° until arriving at line 50. During this part of the wind, coil 9 is partially riding on the coils 7 and 8.

At line 50, which is the beginning of coil 10, coil 10 is wound in a plane substantially perpendicular to the longitudinal central axis of the core 38 for 300°. For the first 60° of the wind of coil 10, which is between lines 50 and 52, coil 10, as shown in FIG. 3, rides on the crossover portion 66 of coils 7 and 8. At line 52, coil 10 is positioned in the groove 48 formed between the coils 7 and 8. Now for 240° of wind which brings coil 10 to approximately line 54, coil 10 is wound in the groove 48 between coils 7 and 8. Thus, coil 10 is securely supported in the groove 48.

The crossover from coil 10 to coil 11 takes place from line 54 to line 50. Therefore, the portion of coil 10 between lines 54 and 50 is not positioned in a groove 48 and hence is slightly raised above the remaining part of coil 10 which is positioned in the groove 48 formed between coils 7 and 8. Coils 11 to 17 are similarly wound.

The crossover from the second layer of coils to the third layer of coils occurring when coils 17 and 18 are wound on the drum 32, is similar to the winding of coils 8 and 9 previously described. Thus just before reaching line 54, the leading end of coil 17 is angled slightly toward the tapered flange 40 to abut against the flange 40. Coil 18 which begins at line 54, is wound for approximately 300° on coil 17 and in abutting contact with the flange 40. After being wound 300°, which brings coil 18 60° from the line 54 or to line 56, the wind is directed inward now toward flange 42 to commence the crossover from coil 18 to coil 19. The crossover portion 46 of coil 18 is angled until reaching line 54. From point 54, coil 19 is wound in a plane substantially perpendicular to the longitudinal central axis of the core 38. For an arcuate distance of approximately 60° between lines 54 and 50 coil 19 rides on the coils 17 and 16. Upon reaching the line 50, coil 19 is positioned in the groove 48 between the coils 17 and 16 of the second cable layer.

Turning now particularly to FIG. 6, the cooperation of the tapered flanges with the coils to provide a compact and secure cable wind will be more fully appreciated. Note, for example, that coil 10 of the second cable layer is positioned in the groove 48 formed between the coils 7 and 8. Coil 10 thus applies a force against coils 7 and 8 whereby coil 8 is forced into a tight abutting relationship with the tapered flange 42 and the core 38 of the drum, and coil 7 abuts against the core 38. Similarly, coil 26 positioned in the groove 48 between coils 9 and 10 forces coil 9 into tight abutment with the flange 42 and coil 10 into tighter contact with the coils 7 and 8 which more securely positions coil 10 in the groove 48 formed by the coils 7 and 8.

If the flanges 40, 42 were tapered substantially greater than 30°, all the coils between the end coils of a layer would not be positioned in grooves 48. Therefore, the 30° taper affords means to prevent the bunching of coils adjacent the tapered flanges and to maximize support and stability of the wound cable coils.

Moreover, the 30° taper enables each layer of cable to comprise one more coil than the previously wound cable layer. As shown, the width of a cable layer increases approximately one-half of a cable diameter adjacent each flange 40, 42 for each successive layer of cable; thereby affording an increase in width of one cable diameter per each successive layer of wound cable.

Figure 7 illustrates a variation of the cable wind device indicated by the reference numeral 30a. The cable wind device 30a is identical in all respects to the device 30 shown in FIGS. 1 to 6 excepting that each layer comprises one more cable coil. Therefore, the first, second and third layers have 9, 10, and 11 coils respectively or a total of 30 coils. The cooperation of the tapered flanges 40, 42 with the coils is substantially independent of the cable diameter, and hence by utilizing the principles of the invention a compact and securely wound cable may be obtained for substantially any cable diameter.

FIGS. 8 and 9 illustrate another embodiment indicated generally by the designation 30b. the innermost cable layer comprises five coils and the next layer six coils. FIG. 9 shows the crossover portions 46 by the cable layers whereas FIG. 8 shows the opposite side of the wound cable to illustrate the greater or main portions 44 of the same layers. Note that the main portions 44 are substantially perpendicular to the longitudinal axis of the drum core 38 and parallel to each other.

The foregoing specification and descriptions are intended as illustrative of our invention, the scope of which is defined in the following claims.

We claim:

1. A combination drum and cable pattern for winding and unwinding cable from the drum, said pattern including a plurality of layers and each layer including a plurality of coils, each of said coils comprising a main portion substantially perpendicular to the central axis of the drum and a crossover portion linking one of said coils to the next coil, the crossover portions of the coils of any one of said layers other than the first wound layer covering an arcuate distance interposed between the arcuate distance covered by the crossover portion of a preceding layer of coils and a subsequent layer of coils, said combination comprising:

flanges having inside surfaces tapering outward from opposed ends of the drum, said inside surface of the flange being defined substantially linear on a plane passing through the flange and the central longitudinal axis line of the drum, the outer longitudinal surface of the drum being defined substantially linear on a plane passing through said outer surface and said central axis;

the end coils of the first layer each abutting the adjacent flange and the drum and an adjacent coil of the first layer, each coil between the end coils of the first layer abutting the drum and coils of the first layer on opposite sides thereof; and the end coils of layers other than the first layer abutting the flange and the adjacent end coil of the last preceding layer and an adjacent coil of the same layer, each coil between the end coils of layers other than the first layer abutting adjacent coils of the same layer on opposite sides thereof and positioned in a groove defined by two adjacent coils of the last previously wound layer.

2. The combination drum and cable pattern of claim 1, wherein each of said coils includes a main portion on a plane substantially perpendicular to the central longitudinal axis of the drum and a crossover portion linking one coil to the next coil of the same layer, said crossover portion extending an arcuate distance of substantially 60° and said main portion being substantially 300°, a groove being defined between the main portion of adjacent abutting coils of the same layer, substantially 240° of the main portion of each coil between the end coils and above the first layer of coils being supported in one of said grooves.

3. The combination drum and cable pattern of claim 1, wherein said taper of the flanges is 30° from a plane normal to the central axis of the drum, each said cable layer increasing in the number of coils by one coil, as compared with the number of the last previously wound layer; and a groove is defined between adjacent abutting coils of the same layer, said tapered flanges cooperating with the coils to enable said cable to be wound whereby each coil between the end coils of layers wound after the first layer is positioned in one of said grooves.

4. A method for winding a cable pattern around a drum having end flanges tapering outward from the drum, said method comprising the steps of:

winding each coil so that a main portion is substantially perpendicular to the central axis of the drum and a crossover portion links one coil with the next coil;

winding the end coils of the first layer of coils, so that each end coil abuts the adjacent flange and the drum and the adjacent coil of the first layer;

winding each coil of the first layer between the end coils, so that each such coil abuts the drum and coils of the first layer on opposite sides thereof;

winding the end coils of layers other than the first layer of coils, so that each end coil abuts the adjacent flange and the adjacent coil of the same layer and the end coil of the last preceding layer;

winding the coils between end coils of layers other than the first layer so that each such coil abuts the coils of the same layer on opposite sides thereof and is positioned in a groove defined by adjacent abutting coils of the last previously wound layer; and winding successive layers of coils so that the crossover portions of one layer are arcuately positioned between the arc defined by the crossover portions of the preceding layer and the arc defined by the crossover portions of the next subsequent layer.

5. A method for winding a cable pattern around a drum having tapered end flanges, said pattern including at least one cable layer having a plurality of coils, each coil including a main portion and a crossover portion linking one coil with the next, said method comprising the steps of:

winding the coils of a first said cable layer in one direction from one flange toward the opposite flange;

positioning said main portion of the first and last coil of said first layer to abut the adjacent flange and the drum and the adjacent coil of the first layer;

positioning the main portions of the coils between the first and the last coil, so that each main portion abuts the drum and the adjacent preceding and subsequent coils;

positioning the crossover portions of the coils which link one coil with the next coil of the same layer substantially parallel with each other; and positioning the crossover portion of the last coil of said layer so that at least a part thereof is spaced from the crossover of the preceding coil and inclined in an upward direction to abut said opposite flange and thereby link said last coil of the first layer with the first coil of a second layer.

6. The method of claim 5 includes:

positioning the crossover portion linking one coil with the next of the same layer of the coils of one layer other than the first layer between the crossover portions of the coils of the last preceding layer and the next subsequent layer; and spacing the leading edges of the last-mentioned crossover portions of said one layer from the leading edges of the crossover portions of the next layer by 60°.

7. The method of claim 6 wherein said flange is tapered substantially 30° and said method further comprises:

increasing the number of coils from one layer to the next layer by one coil, so that the end coils of each layer abut against the adjacent flange and are stacked one on top of the other and the coils between the end coils of the layers other than the first layer are positioned in a groove defined between two abutting adjacent coils of the last previously wound layer.